United States Patent
Chen et al.

(10) Patent No.: US 7,808,301 B2
(45) Date of Patent: Oct. 5, 2010

(54) MULTIPLE-STAGE CHARGE PUMP CIRCUIT WITH CHARGE RECYCLE CIRCUIT

(75) Inventors: Chung-Kuang Chen, Taipei (TW); Chun-Hsiung Hung, Hsinchu (TW); Yi-Te Shih, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 170 days.

(21) Appl. No.: 11/878,653

(22) Filed: Jul. 26, 2007

(65) Prior Publication Data
US 2009/0027108 A1 Jan. 29, 2009

(51) Int. Cl.
*G05F 1/10* (2006.01)

(52) U.S. Cl. .......................... 327/536; 327/157; 363/59; 363/60

(58) Field of Classification Search .................. 327/157, 327/534–536, 537; 363/59–60
See application file for complete search history.

(56) References Cited

U.S. PATENT DOCUMENTS

| | | | |
|---|---|---|---|
| 5,818,289 A * | 10/1998 | Chevallier et al. | 327/536 |
| 7,365,591 B2 * | 4/2008 | Tobita | 327/536 |
| 2006/0061410 A1 * | 3/2006 | Chiu et al. | 327/536 |
| 2006/0132220 A1 * | 6/2006 | Lee | 327/536 |

* cited by examiner

*Primary Examiner*—Lincoln Donovan
*Assistant Examiner*—Shikha Goyal
(74) *Attorney, Agent, or Firm*—Bacon & Thomas, PLLC

(57) ABSTRACT

A multiple-stage charge pump circuit includes first and second pump capacitors, a charge recycle circuit, and first and second transfer circuits. The charge recycle circuit includes first and second driving circuits and a switch circuit turning off to make a node floating and to couple first terminals of the first and second pump capacitors to the node in a first time period. The switch circuit and first and second driving circuits provide a specific voltage to the node and control voltages at the first terminals of the first and second pump capacitors in second and third time periods, respectively. The first and second transfer circuits provide a high voltage to a second terminal of the first pump capacitor in the second time period, and provide the voltage of the second terminal of the first pump capacitor to a second terminal of the second pump capacitor in the third time period.

24 Claims, 9 Drawing Sheets

US 7,808,301 B2

MULTIPLE-STAGE CHARGE PUMP CIRCUIT WITH CHARGE RECYCLE CIRCUIT

BACKGROUND OF THE INVENTION

1. Field of the Invention

The invention relates in general to a multiple-stage charge pump circuit, and more particularly to a multiple-stage charge pump circuit capable of recycling charges.

2. Description of the Related Art

In the technological age which changes with each passing day, a multiple-stage charge pump has been widely used in an occasion, in which a voltage signal having a voltage higher than a power voltage is used, and the high voltage may be needed to write or erase an electrically erasable programmable read only memory (EEPROM).

FIG. 1 (Prior Art) is a circuit diagram showing a conventional multiple-stage charge pump 100. Referring to FIG. 1, the multiple-stage charge pump 100 includes four stages of unit circuits 120 each including a diode D and a pumping capacitor C. Clock signals CK1 and CK2 having inverse phases respectively control the diodes in the odd-numbered stage of unit circuits and the even-numbered stage of unit circuits to turn on in alternate time periods so that charges in the pump capacitor of a previous-stage unit circuit charge the pump capacitor in the corresponding unit circuit. Thus, an output signal Vo having the level of voltage approximating to five times of the voltage (Vdd-Vd) can be generated by way of superimposing. Vd is the diode turn on voltage.

However, since each pump capacitor has to be repeatedly charged and discharged, the conventional multiple-stage charge pump circuit has the drawbacks of the high power consumption and the low power efficiency. Thus, it is an important subject of the invention to design a multiple-stage charge pump circuit having the low power consumption and the high power efficiency.

SUMMARY OF THE INVENTION

The invention is directed to a multiple-stage charge pump circuit having the advantages of the lower power consumption and the higher power efficiency relative to the conventional multiple-stage charge pump circuit.

According to a first aspect of the present invention, a multiple-stage charge pump circuit is provided. The multiple-stage charge pump circuit includes a first pump capacitor, a second pump capacitor, a charge recycle circuit, a first transfer circuit and a second transfer circuit. The charge recycle circuit connects second terminals of the first and second pump capacitors together in a first time period. The charge recycle circuit includes a first node, a first driving circuit, a second driving circuit and a first switch circuit. The first switch circuit turns on to provide a high voltage to the first node in a second time period and a third time period, and turns off in the first time period. The first and second driving circuits connect the second terminals of the first pump capacitor and the second pump capacitor to the first node in response to first and second clock signals in the first time period, respectively. The first and second transfer circuits provide the high voltage to a first terminal of the first pump capacitor in the second time period and provide a voltage of the first terminal of the first pump capacitor to a first terminal of the second pump capacitor in the third time period, respectively. The first driving circuit provides a low voltage and the high voltage to the second terminal of the first pump capacitor in the second and third time periods, respectively. The second driving circuit provides the high voltage and the low voltage to the second terminal of the second pump capacitor in the second and third time periods, respectively.

According to a second aspect of the present invention, a charge recycling method applied in a multiple-stage charge pump circuit, which comprises a first pump capacitor and a second pump capacitor is provided. The charge recycling method recycles charge in the first pump capacitor to the second pump capacitor or recycling charge in the second pump capacitor to the first pump capacitor in a first time period. The charge recycling method comprises: enabling a first switch to provide a first voltage to a first node and providing the first voltage at the first node to a first end of the first pump capacitor in a second time period; enabling the first switch to provide the first voltage to the first node and providing the voltage at the first node to a first end of the second pump capacitor in a third time period; and disabling the first switch to make the first node floating and short connecting the first end of the first and the second pump capacitors so as to recycle charge stored in one of the first and the second pump capacitors to the other in the first time period.

The invention will become apparent from the following detailed description of the preferred but non-limiting embodiments. The following description is made with reference to the accompanying drawings.

DETAILED DESCRIPTION OF THE INVENTION

The invention provides a multiple-stage charge pump circuit having a charge recycle circuit for enabling charges stored in a corresponding pump capacitor in one charge pump circuit to be recycled in the corresponding capacitor of another charge pump circuit through a short-circuited loop formed by the charge recycle circuit so that the power consumption may be reduced.

First Embodiment

Figure 1:
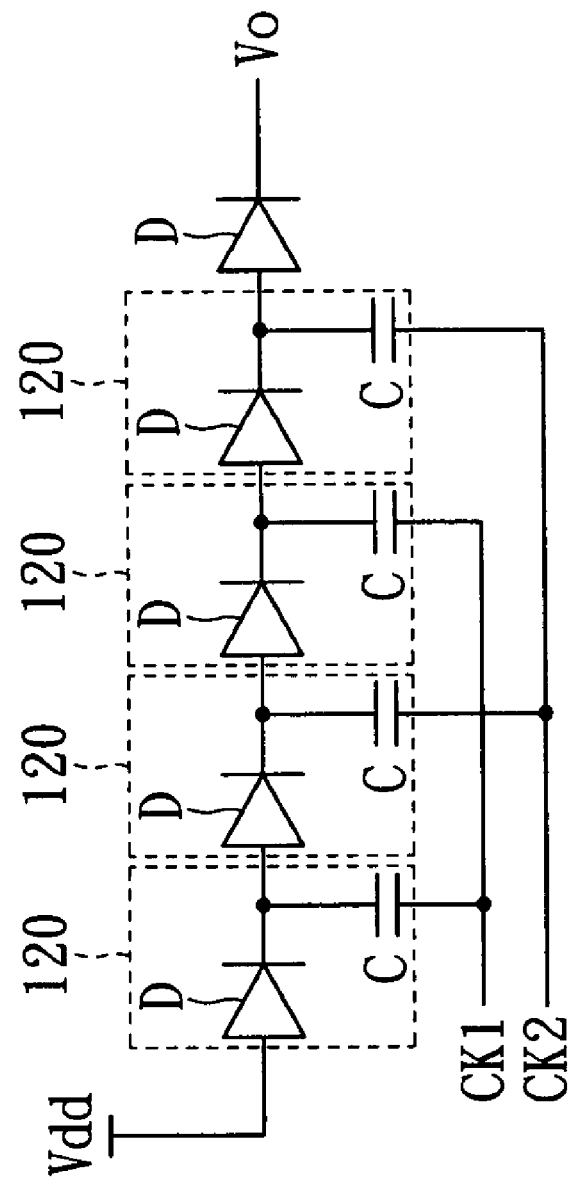
FIG. 1 (Prior Art) is a circuit diagram showing a conventional multiple-stage charge pump.
Figure 2:
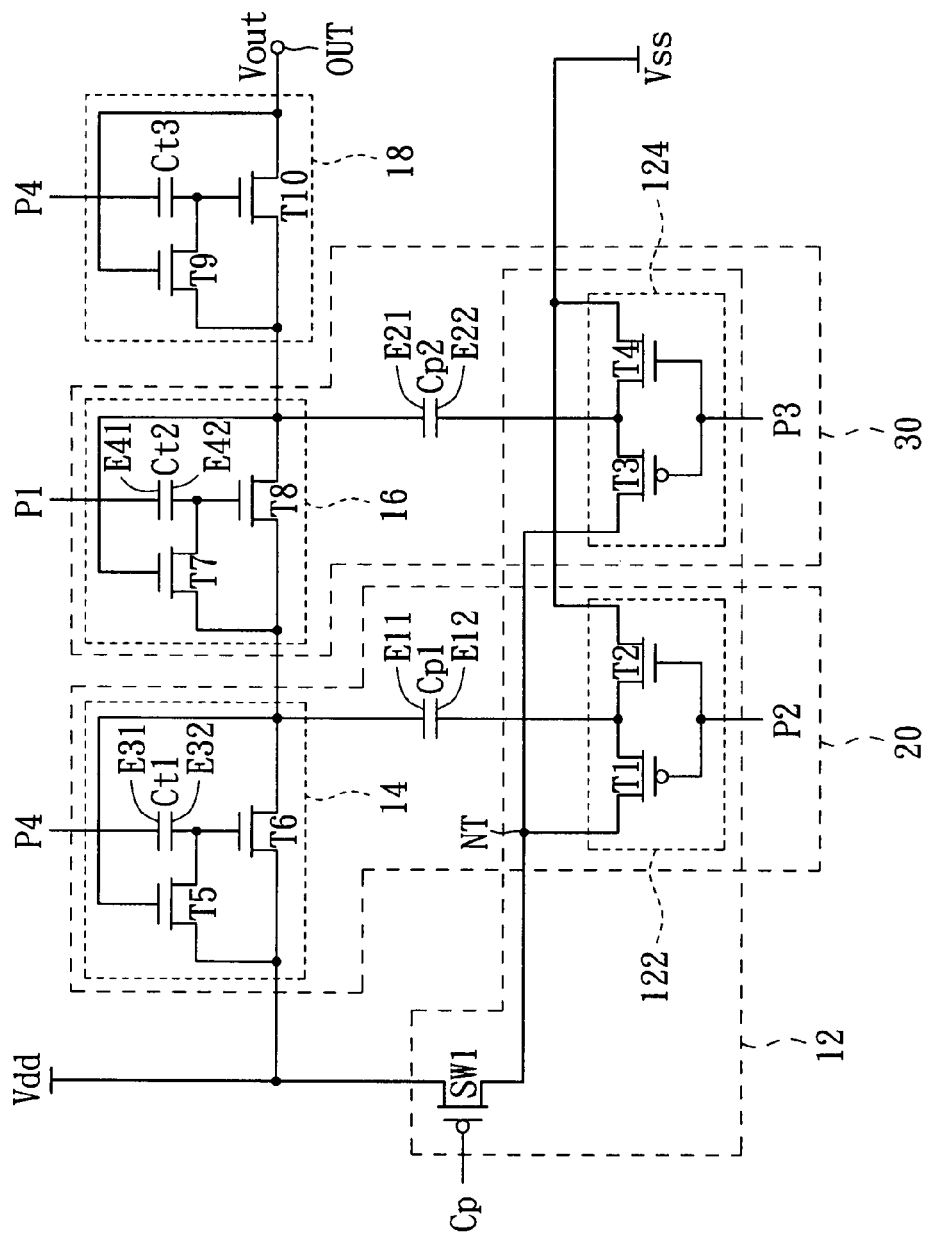
FIG. 2 is a circuit diagram showing a multiple-stage charge pump circuit according to a first embodiment of the invention.
Figure 3:
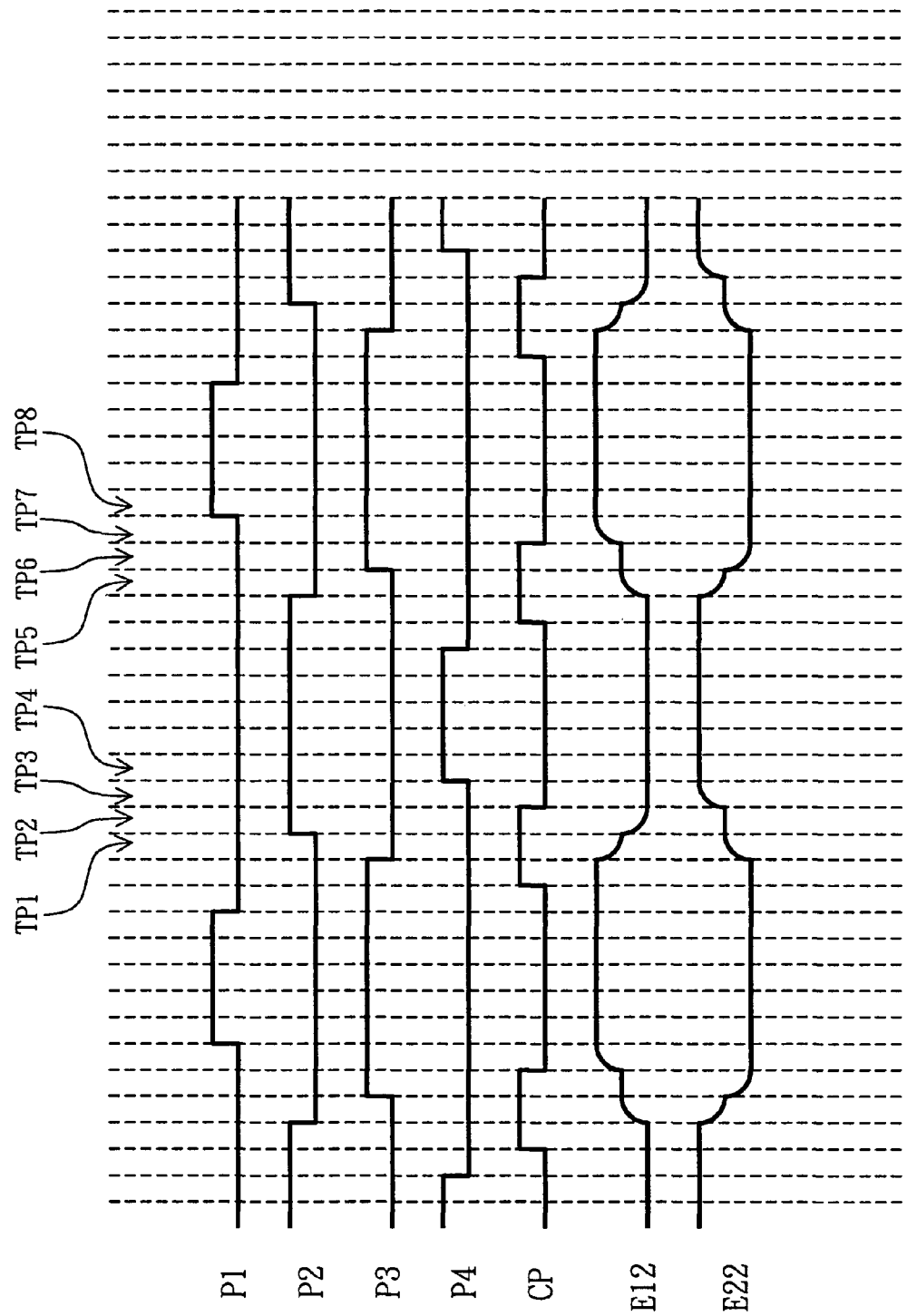
FIG. 3 shows timing charts of associated signals in FIG. 2.

FIG. 2 is a circuit diagram showing a multiple-stage charge pump circuit 10 according to a first embodiment of the invention. FIG. 3 shows timing charts of associated signals in FIG. 2. Referring to FIGS. 2 and 3, the multiple-stage charge pump circuit 10 includes pump capacitors Cp1 and Cp2, a charge recycle circuit 12 and transfer circuits 14 and 16. The pump capacitor Cp1 includes a first terminal E11 and a second terminal E12, and the pump capacitor Cp2 includes a first terminal E21 and a second terminal E22. The first terminals E11 and E21 are respectively connected to the transfer circuits 14 and 16, and the second terminals E12 and E22 are connected to the charge recycle circuit 12.

The charge recycle circuit 12 includes a switch circuit SW1, a node NT and driving circuits 122 and 124. The switch circuit SW1 has one terminal for receiving a high voltage Vdd and the other terminals coupled to the node NT. The driving circuit 122 has a first terminal coupled to the node NT, a second terminal coupled to the second terminal E12 and a third terminal for receiving a low voltage Vss. The driving circuit 124 has a first terminal coupled to the node NT, a second terminal coupled to the second terminal E22, and a third terminal for receiving the low voltage Vss.

In second time period TP4, third time period TP8 and time periods TP3, and TP7, the switch circuit SW1 turns on to provide the high voltage Vdd to the node NT. From the time period TP2, the driving circuits 122 provides the low voltage Vss to the second terminal E12. From the time period TP6, the driving circuits 124 provides the low voltage Vss to the second terminal E22. From the time period TP3, the driving circuits 124 provides the high voltage Vdd to the second terminal E22. From the time period TP7, the driving circuits 122 provides the high voltage Vdd to the second terminal E12.

In first time period TP1 and a time period TP5, the terminals E12 and E22 are respectively connected or short-circuited and the switch circuit SW1 turns off so that the second terminals E12 and E22 and the node NT are floating shorted. Consequently, the charges on the second terminals E12 and E22 which having the higher voltages is transferred to the other through the above-mentioned short-circuited paths so that the charge is recycled. Next, the detailed circuits in the multiple-stage charge pump circuit 10 will be described in the following.

The switch circuit SW1 is a P-type metal oxidation semiconductor (PMOS) transistor having a source for receiving the high voltage Vdd, a drain coupled to the node NT and a gate for receiving a control signal Cp. In the first time period TP1 and the time periods TP2, TP5, and TP6, the control signal Cp has the high level. In the third time period TP8 and the time periods TP3, TP4, and TP7, the control signal Cp has the low level. The switch circuit SW1 turns on in response to the low level of the control signal Cp in the third time period TP8 and the time periods TP3, TP4, and TP7 to provide the high voltage Vdd to the node NT, and turns off in response to the high level of the control signal Cp in the first time period TP1 and the time periods TP2, TP5 and TP6.

The driving circuit 122 includes transistors T1 and T2, which are respectively a PMOS transistor and an N-type metal oxidation semiconductor (NMOS) transistor, for example. The drains of the transistors T1 and T2 are coupled to the second terminal E12. The sources of the transistors T1 and T2 are respectively coupled to the node NT and receive the low voltage Vss. The gates of the transistors T1 and T2 receive a clock signal P2. The transistors T1 and T2 turn on in response to the low level and the high level of the clock signal P2 to provide the voltage on the node NT and the low voltage Vss to the second terminal E12, respectively. The driving circuits 124 and 122 have substantially similar circuit structures and operations, wherein transistors T3 and T4 turn on in response to the low level and the high level of a clock signal P3 to provide the voltage on the node NT and the low voltage Vss to the second terminal E22, respectively.

A phase difference between the clock signals P2 and P3 substantially approaches 180 degrees, and the voltage levels of the second terminals E12 and E22 are controlled by controlling the driving circuits 122 and 124 to perform the substantial inverse operations according to the phase difference. However, duty cycles of the clock signals P2 and P3 in this embodiment are smaller than 50%, and have the low levels in the first time period TP1 and the time period TP5 so that the transistors T2 and T4 turn off while the transistors T1 and T3 turn on. Consequently, the second terminals E12 and E22 are substantially connected and short-circuited to the node NT. In the first time period TP1 and the time period TP5, the control signal Cp has the high level so that the switch circuit SW1 turns off. Consequently, the charges stored in one of the second terminals E12 and E22 may be transferred to the other one of the second terminals E12 and E22 through the short-circuited path formed by the transistors T1 and T3. For example, in the first time period TP1, an initial voltage of the second terminal E12 is higher than the voltage of the second terminal E22. At this time, the charges stored in the second terminal E12 is transferred to the second terminal E22 through the short-circuited path mentioned hereinabove so that the voltages of the second terminals E12 and E22 substantially approximate to each other. The charges in the second terminal E22 may also be transferred to the second terminal E12 through the substantially similar paths in the time period TP5. Consequently, the multiple-stage charge pump circuit 10 of this embodiment can effectively recycle the charges on the second terminals E12 and E22 in order to reduce the power consumed during the operations thereof.

The transfer circuit 14 includes a transfer capacitor Ct1 and transistors T5 and T6, while the transfer circuit 16 includes a transfer capacitor Ct2 and transistors T7 and T8. Because the transfer circuits 14 and 16 have substantially the same circuit structure and operation except that the phase difference between the received clock signals P4 and P1 is equal to 180 degrees, only the transfer circuit 14 is described as an example. The transfer capacitor Ct1 includes a first terminal E31 for receiving the clock signal P4, and a second terminal E32. The transistor T5, such as a NMOS transistor, has a gate coupled to the first terminal E11, a drain for receiving the high voltage Vdd, and a source coupled to the second terminal E32. The transistor T5 is designed to setup the voltage of the second terminal E32 when the voltage of the first terminal E11 goes high, and T6 is diode connected. After setup the voltage of the second terminal E32, then clock P4 goes high to pass the high voltage Vdd to the second terminal E32. The transfer capacitor Ct2 includes a first terminal E41 for receiving the clock signal P1, and a second terminal E42. The transistor T7, such as a NMOS transistor, has a gate coupled to the first terminal E21, a drain for receiving the high voltage at the first terminal E11, and a source coupled to the second terminal E42. The transistor T7 is designed to setup the voltage of the second terminal E42 when the voltage of the first terminal E21 goes high, and T8 is diode connected. After setup the voltage of the second terminal E42 then clock P1 goes high to pass the high voltage Vdd to the second terminal E42.

The transistor T6, such as the NMOS transistor, has a gate coupled to the second terminal E32, a drain for receiving the high voltage Vdd, and a source coupled to the first terminal E11. The transistor T6 passes the high voltage Vdd to the first terminal E11 when the voltage of the second terminal E32 is higher than high voltage Vdd. After T6 pass Vdd to E11, clock P4 goes low to couple the second terminal E32 to lower voltage and turns off MOS T6 to avoid charge flows back from the first terminal E11 to high voltage Vdd. The transistor T8, such as the NMOS transistor, has a gate coupled to the second terminal E42, a drain for receiving the high voltage from the first terminal E11, and a source coupled to the first terminal E21. The transistor T8 passes the high voltage at the first terminal E11 to the first terminal E21 when the voltage of the second terminal E42 is higher than the voltage on the first terminal E11. After T8 pass the high voltage at the first terminal E11 to the first terminal E21, clock P1 goes low to couple E42 to lower voltage and turns off MOS T8 to avoid charge flows back from the first terminal E21 to the first terminal E11.

The driving circuit 122 pulls the voltage of the second terminal E12 down to the low voltage Vss so that the voltage between the first terminal E11 and the second terminal E12 substantially approximates to the high voltage Vdd. Consequently, when the driving circuit 122 increases the voltage of the second terminal E12 from the low voltage Vss to the high voltage Vdd in response to the low level of the clock signal P2, the voltage of the first terminal E11 approximates to two times of the high voltage Vdd. Thereafter, the voltage of the first terminal E21 is increased to a voltage approximating to three times of the high voltage Vdd according to the substantially similar operations, and the voltage thereof is outputted. Thus, the multiple-stage charge pump circuit 10 of this embodiment can effectively output an output signal Vout having a voltage substantially approximating to three times of the high voltage Vdd.

The multiple-stage charge pump circuit 10 of this embodiment further includes an output stage circuit 18, which includes a transfer capacitor Ct3 and transistors T9 and T10. The output stage circuit 18 and the transfer circuit 14 have substantially the same structure and operation. The output stage circuit 18 provides the voltage of the first terminal E21 to an output terminal OUT to serve as the output signal Vout. The output stage circuit 18 may also turn on the transistor T9 to make the transistor T10 be equivalent to a diode so as to prevent the output signal Vout from charging the pump capacitor Cp2 and thus influencing the voltage of the output signal Vout when the voltage of the first terminal E21 is lower than the voltage of the output terminal OUT.

Figure 4:
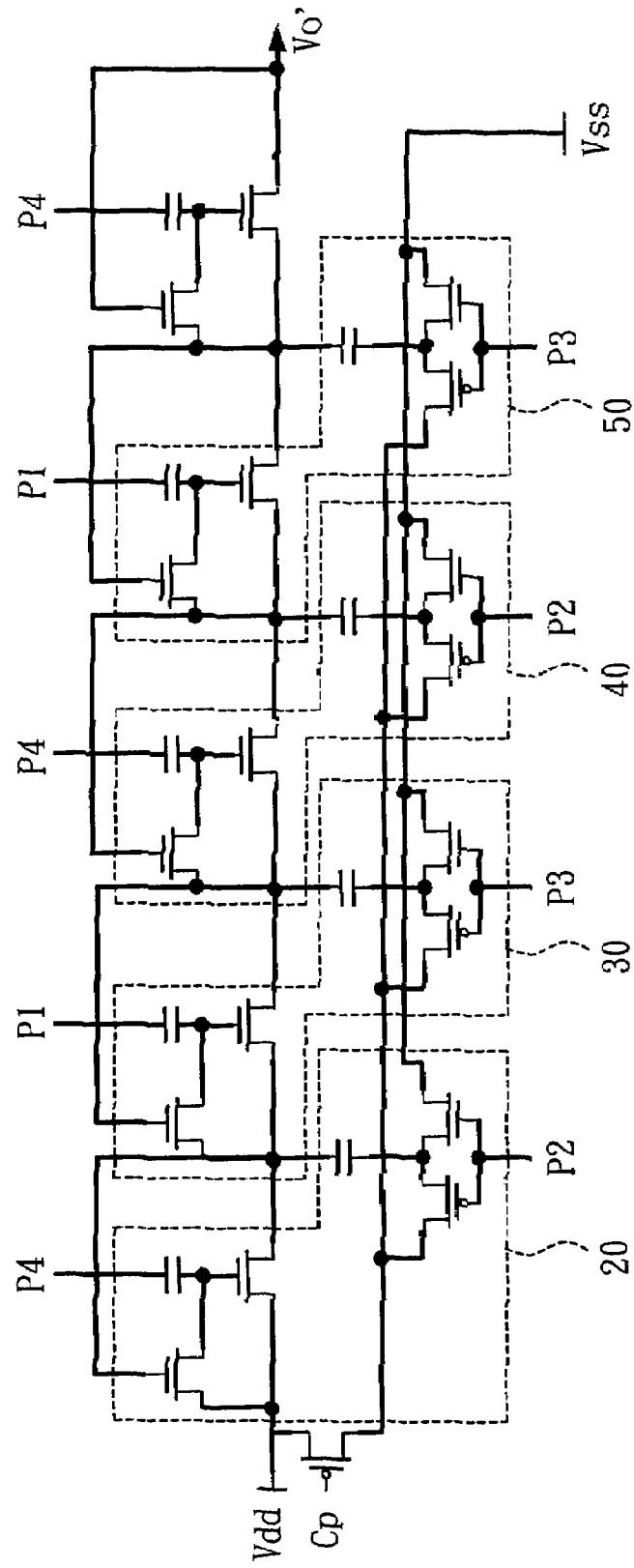
FIG. 4 is another circuit diagram showing the multiple-stage charge pump circuit according to this embodiment of the invention.

The transfer circuit 14, the pump capacitor Cp1 and the driving circuit 122 substantially form a first charge pump circuit 20, while the transfer circuit 16, the pump capacitor Cp2 and the driving circuit 124 substantially form a second charge pump circuit 30. In this embodiment, the multiple-stage charge pump circuit 10 only includes the first and second charge pump circuits 20 and 30. However, the multiple-stage charge pump circuit of this embodiment may further include first to fourth charge pump circuits 20 to 50, wherein sources of the PMOS transistor and the NMOS transistors in all driving circuits are coupled to each other to output an output signal Vo' having a voltage substantially approximating to five times of the high voltage Vdd, as shown in FIG. 4. The multiple-stage charge pump circuit 10 of this embodiment may further include first to $n^{th}$ charge pump circuits, to output the output signal having the voltage substantially approximating (n+1) times of the high voltage Vdd, wherein n is a number larger than 1.

The multiple-stage charge pump circuit of this embodiment includes the charge recycle circuit so that the charges stored in the corresponding pump capacitor of one circuit can be recycled by the corresponding capacitor in another charge pump circuit through the short-circuited loop formed by the charge recycle circuit. Thus, the object of reducing the power consumption can be achieved. Consequently, the multiple-stage charge pump circuit of this embodiment has the advantages of the lower power consumption and the higher power efficiency as compared with the conventional multiple-stage charge pump circuit.

Second Embodiment

Figure 5:
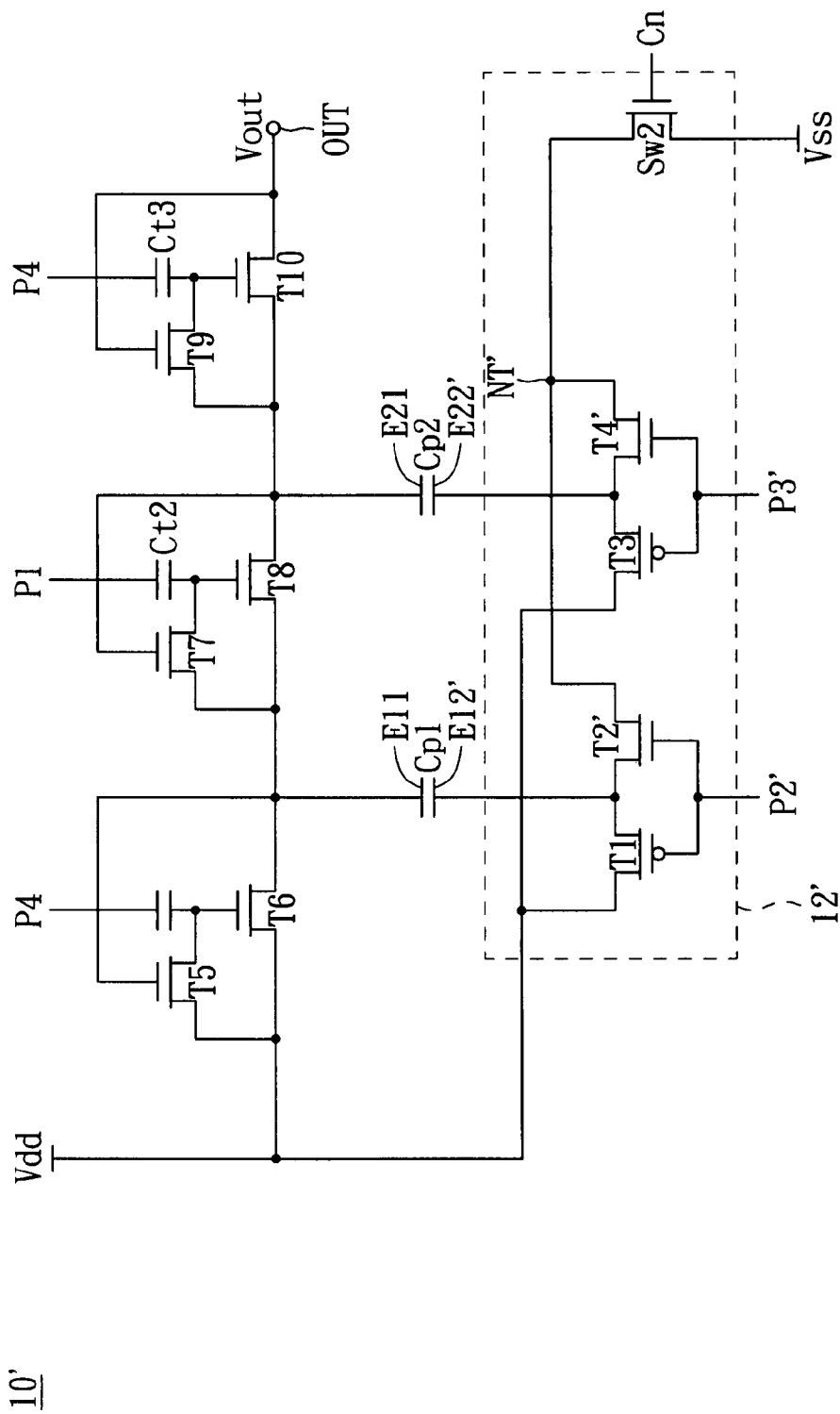
FIG. 5 is a circuit diagram showing a multiple-stage charge pump circuit according to a second embodiment of the invention.
Figure 6:
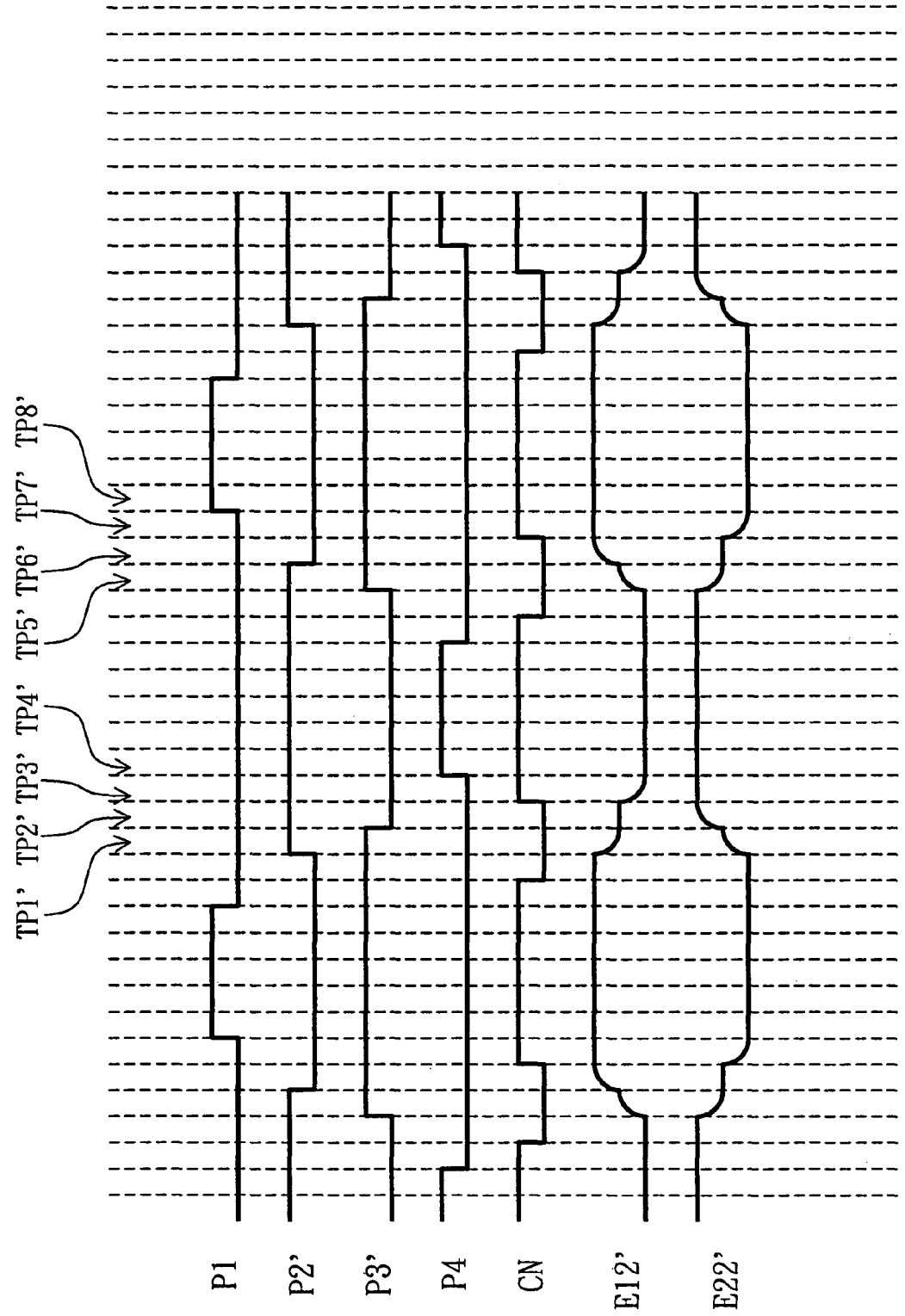
FIG. 6 shows timing charts of associated signals in FIG. 5.

FIG. 5 is a circuit diagram showing a multiple-stage charge pump circuit 10' according to a second embodiment of the invention. FIG. 6 shows timing charts of associated signals in FIG. 5. Referring to FIGS. 5 and 6, the charge pump circuit 10' differs from the charge pump circuit 10 of the first embodiment in that the switch circuit SW1 and the node NT in the charge recycle circuit 12 of the first embodiment are respectively replaced with a switch circuit SW2 and a node NT' in a charge recycle circuit 12' of the second embodiment, and clock signals P2' and P3' in first time period TP1' and a time period TP5' have the high levels so that transistors T2' and T4' turn on to connect second terminals E12' and E22' to the node NT' in the first time period TP1' and the time period TP5'.

The switch circuit SW2, such as a NMOS transistor, turns on to provide the low voltage Vss to the node NT' in response to the high levels of a control signal Cn having an inverse phase to the phase of the control signal Cp, and turns off in response to the low level of the control signal Cn. In the first time period TP1' and the time period TP5', the control signal Cn has the low level to turn off the switch circuit SW2 and prevent the low voltage Vss from influencing the levels of the second terminals E12' and E22'. At this time, the charges stored in one of the terminals E12' and E22' can be transferred to the other one of the terminals E12' and E22' through the short-circuited path formed by transistors T2' and T4' so that the voltage of the second terminals E12' and E22' substantially approximate to each other.

Figure 7:
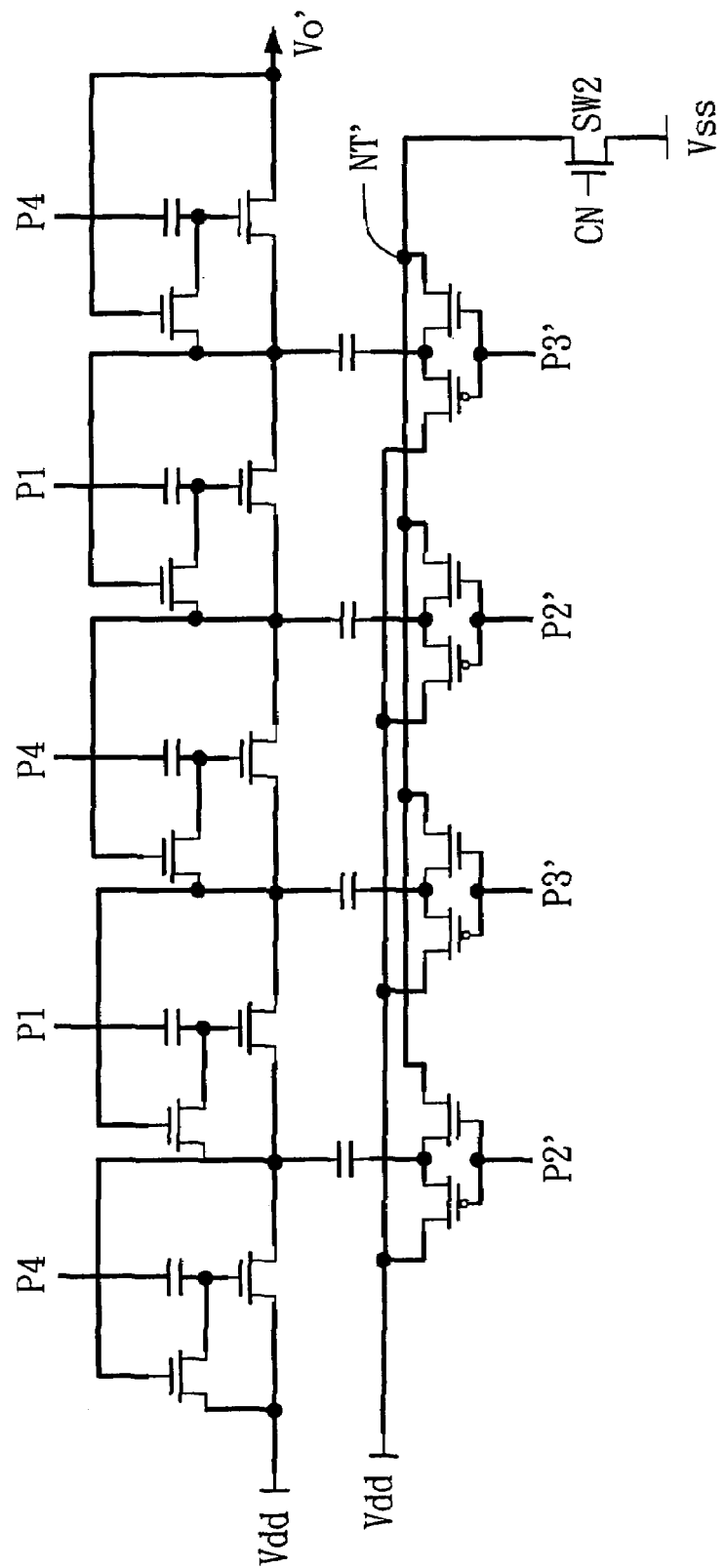
FIG. 7 is another circuit diagram showing the multiple-stage charge pump circuit according to the second embodiment of the invention.

The multiple-stage charge pump circuit 10' of this embodiment may also include n charge pump circuits to generate an output signal Vo" having a voltage substantially equal to (n+1) times of the high voltage Vdd, as shown in FIG. 7. As a result, the multiple-stage charge pump circuit of this embodiment has the advantages of the lower power consumption and the higher power efficiency as compared with the conventional multiple-stage charge pump circuit.

Third Embodiment

Figure 8:
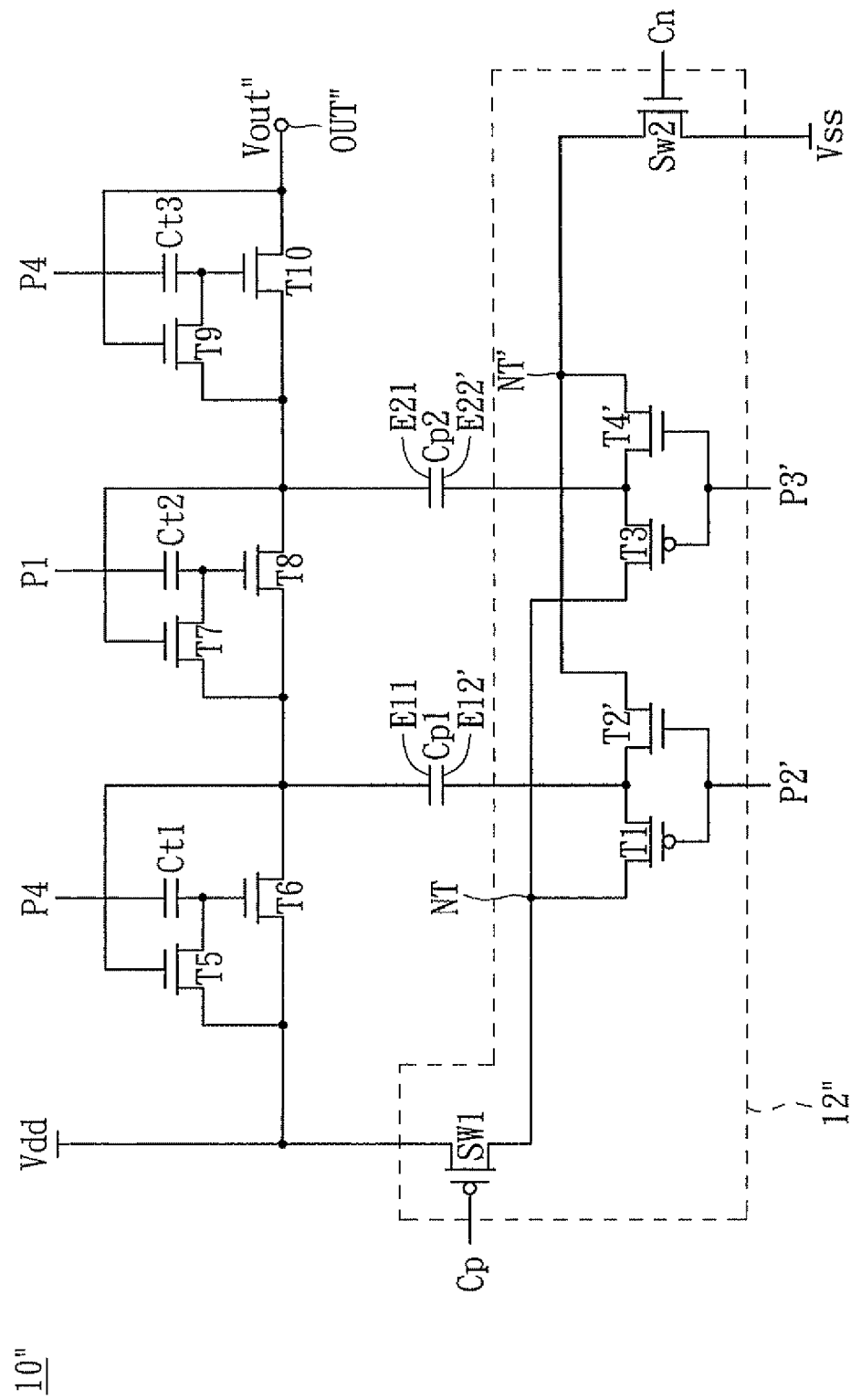
FIG. 8 is a circuit diagram showing a multiple-stage charge pump circuit according to a third embodiment of the invention.

FIG. 8 is a circuit diagram showing a multiple-stage charge pump circuit according to a third embodiment of the invention. Referring to FIG. 8, a multiple-stage charge pump circuit 10" of the third embodiment differs from the multiple-stage charge pump circuit 10' of the second embodiment in that a charge recycle circuit 12" further includes the switch circuit SW1 and the node NT. Thus, The multiple-stage charge pump circuit 10" of this embodiment can perform the operations substantially the same as those of the multiple-stage charge pump circuit 10 of the first embodiment in response to the clock signals P1, P2, P3 and P4 and the control signal Cp of the first embodiment and the multiple-stage charge pump circuit 10' of the second embodiment in response to the clock signals P1, P2', P3' and P4 and the control signal Cn of the second embodiment.

In this illustrated embodiment, the multiple-stage charge pump circuit 10" performs the operations substantially the same as those of the multiple-stage charge pump circuit 10' of the second embodiment in response to the signals of the second embodiment. However, the multiple-stage charge pump circuit 10" of this embodiment may also perform the operations substantially the same as those of the multiple-stage charge pump circuit 10 of the first embodiment in response to the clock signals P1 to P4 and the control signal Cp of the first embodiment. The operation of the switch circuit SW1 may further be controlled according to the control signal Cp of the first embodiment.

Figure 9:
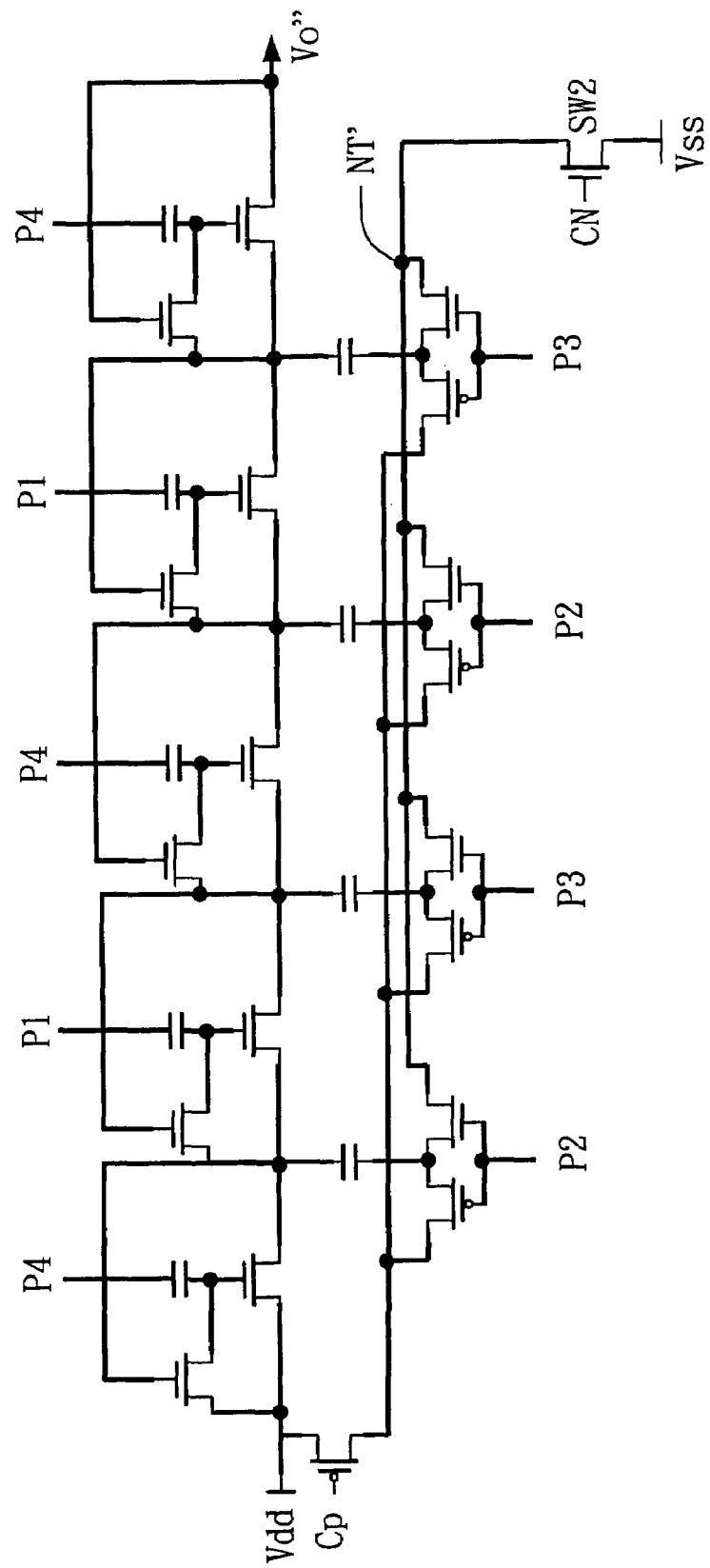
FIG. 9 is another circuit diagram showing the multiple-stage charge pump circuit according to the third embodiment of the invention.

The multiple-stage charge pump circuit 10''' of this embodiment may also include n charge pump circuits to generate an output signal Vo''' having a voltage substantially equal to (n+1) times of the high voltage Vdd, as shown in FIG. 9. Consequently, the multiple-stage charge pump circuit of this embodiment has the advantages of the lower power consumption and the higher power efficiency as compared with the conventional multiple-stage charge pump circuit.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multiple-stage charge pump circuit, comprising:
   a first pump capacitor and a second pump capacitor each comprising a first terminal and a second terminal;
   a charge recycle circuit for connecting the second terminal of the first pump capacitor to the second terminal of the second pump capacitor in a first time period, the charge recycle circuit comprising:
   a first node;
   a first switch circuit, which turns on in a second time period and a third time period to provide a first voltage to the first node, and turns off in the first time period; and
   a first driving circuit and a second driving circuit for connecting the second terminal of the first pump capacitor and the second terminal of the second pump capacitor to the first node in response to a first clock signal and a second clock signal in the first time period, respectively;
   a first transfer circuit for providing a supply voltage to the first terminal of the first pump capacitor in the second time period; and
   a second transfer circuit for providing a voltage of the first terminal of the first pump capacitor to the first terminal of the second pump capacitor in the third time period.

2. The circuit according to claim 1, wherein:
   the first driving circuit provides a second voltage and the first voltage to the second terminal of the first pump capacitor in the second time period and the third time period, respectively; and
   the second driving circuit provides the first voltage and the second voltage to the second terminal of the second pump capacitor in the second time period and the third time period, respectively.

3. The circuit according to claim 1, wherein the first driving circuit comprises:
   a first transistor comprising a control terminal for receiving the first clock signal, a first terminal coupled to the first node, and a second terminal coupled to the second terminal of the first pump capacitor; and
   a second transistor comprising a control terminal for receiving the first clock signal, a first terminal for receiving a second voltage, and a second terminal coupled to the second terminal of the first pump capacitor,
   wherein the first transistor is turned on in the first time period, so as to connect the second terminal of the first pump capacitor to the first node in the first time period.

4. The circuit according to claim 1, wherein the second driving circuit comprises:
   a third transistor comprising a control terminal for receiving the second clock signal, a first terminal coupled to the first node, and a second terminal coupled to the second terminal of the second pump capacitor; and
   a fourth transistor comprising a control terminal for receiving the second clock signal, a first terminal for receiving a second voltage, and a second terminal coupled to the second terminal of the second pump capacitor,
   wherein the third transistor is turned on in the first time period, so as to connect the second terminal of the second pump capacitor to the first node in the first time period.

5. The circuit according to claim 1, wherein the first transfer circuit comprises:
   a first transfer capacitor comprising a first terminal for receiving a third clock signal, and a second terminal;
   a fifth transistor for providing the supply voltage to the first terminal of the first pump capacitor when a voltage of the second terminal of the first transfer capacitor is higher than the voltage of the first terminal of the first pump capacitor; and
   a sixth transistor for providing the supply voltage to the second terminal of the first transfer capacitor to setup the gate bias of the fifth transistor.

6. The circuit according to claim 1, wherein the second transfer circuit comprises:
   a second transfer capacitor comprising a first terminal for receiving a fourth clock signal, and a second terminal;
   a seventh transistor for providing the voltage of the first terminal of the first pump capacitor to the first terminal of the second pump capacitor when a voltage of the second terminal of the second transfer capacitor is higher than a voltage of the first terminal of the second pump capacitor; and
   an eighth transistor for providing the voltage of the first terminal of the first pump capacitor to the second terminal of the second transfer capacitor to setup the gate bias of the seventh transistor.

7. The circuit according to claim 1, wherein the first switch circuit comprises:
   a ninth transistor comprising a control terminal for receiving a first switch control signal, a first terminal for receiving the first voltage, and a second terminal coupled to the first node.

8. The circuit according to claim 1, wherein the charge recycle circuit comprises:
   a second node; and
   a second switch circuit, which turns on in the second time period and the third time period to provide a second voltage to the second node, and turns off in the first time period.

9. The circuit according to claim 8, wherein the first driving circuit comprises:
   a tenth transistor comprising a control terminal for receiving the first clock signal, a first terminal coupled to the first node, and a second terminal coupled to the second terminal of the first pump capacitor; and
   an eleventh transistor comprising a control terminal for receiving the first clock signal, a first terminal coupled to the second node, and a second terminal coupled to the second terminal of the first pump capacitor.

10. The circuit according to claim 8, wherein the second driving circuit comprises:
    a twelfth transistor comprising a control terminal for receiving the second clock signal, a first terminal coupled to the first node, and a second terminal coupled to the second terminal of the second pump capacitor; and
    a thirteenth transistor comprising a control terminal for receiving the second clock signal, a first terminal coupled to the second node, and a second terminal coupled to the second terminal of the second pump capacitor.

11. The circuit according to claim 8, wherein the second switch circuit comprises:
a fourteenth transistor comprising a control terminal for receiving a second switch control signal, a first terminal for receiving the second voltage, and a second terminal coupled to the second node.

12. The circuit according to claim 8, wherein the first voltage is a high voltage and the second voltage is a low voltage in the multiple-stage charge pump circuit.

13. The circuit according to claim 1, further comprising:
an output stage circuit for providing a voltage of the first terminal of the second pump capacitor to an output terminal, the output stage circuit comprising:
a third transfer capacitor comprising a first terminal for receiving a third clock signal, and a second terminal;
a fifth transistor for providing the voltage of the first terminal of the second pump capacitor to the output terminal when a voltage of the second terminal of the third transfer capacitor is higher than a voltage of the output terminal; and
a sixth transistor for providing the voltage of the first terminal of the second pump capacitor to the second terminal of the third transfer capacitor to bias the control gate of the fifth transistor.

14. The circuit according to claim 1, wherein:
the first transfer circuit, the first pump capacitor and the first driving circuit form a first circuit, and the second transfer circuit, the second pump capacitor and the second driving circuit form a second circuit; and
the multiple-stage charge pump circuit further comprises a third circuit and a fourth circuit, which have substantially the same structures and operations as the first circuit and the second circuit, respectively.

15. The circuit according to claim 8, wherein the first voltage is a low voltage and the second voltage is a high voltage in the multiple-stage charge pump circuit.

16. The circuit according to claim 8, wherein the first voltage is a high voltage and the second voltage is a low voltage in the multiple-stage charge pump circuit.

17. A charge recycling method, applied in a multiple-stage charge pump circuit, which comprises a first pump capacitor and a second pump capacitor, the charge recycling method recycling charge in the first pump capacitor to the second pump capacitor or recycling charge in the second pump capacitor to the first pump capacitor in a first time period, the charge recycling method comprising:
enabling a first switch to provide a first voltage to a first node and providing the first voltage at the first node to a first end of the first pump capacitor via a first driving circuit in a second time period;
enabling the first switch to provide the first voltage to the first node and providing the first voltage at the first node to a first end of the second pump capacitor via a second driving circuit in a third time period;
disabling the first switch to make the first node floating; and
short connecting the first end of the first and the second pump capacitors to the floating first node via the first and the second driving circuits, so as to recycle charge stored in one of the first and the second pump capacitors to the other in the first time period.

18. The charge recycling method according to claim 17, further comprising:
providing a second voltage to the first end of the second pump capacitor in the second time period; and
providing the second voltage to the first end of the first pump capacitor in the third time period.

19. The charge recycling method according claim 17, further comprising:
enabling a second switch to provide a second voltage to a second node and providing the second voltage at the second node to the first end of the second pump capacitor in the second time period; and
enabling the second switch to provide the second voltage to the second node and providing the second voltage at the second node to the first end of the first pump capacitor in the third time period.

20. The charge recycling method according to claim 17, further comprising:
providing a supply voltage to a second terminal of the first pump capacitor in the third time period; and
providing a voltage of the second terminal of the first pump capacitor to a second terminal of the second pump capacitor in the second time period.

21. The charge recycling method according to claim 20, further comprising:
providing a voltage of the second terminal of the second pump capacitor to an output end of the multiple-stage charge pump circuit so as to output an output signal in the third time period.

22. The charge recycling method according to claim 17, further comprising:
providing a supply voltage to a second terminal of the first pump capacitor in the second time period; and
providing a voltage of the second terminal of the first pump capacitor to a second terminal of the second pump capacitor in the third time period.

23. The charge recycling method according to claim 22, further comprising:
providing a voltage of the second terminal of the second pump capacitor to an output end of the multiple-stage charge pump circuit so as to output an output signal in the second time period.

24. The circuit according to claim 1, wherein:
the first driving circuit and the second driving circuit for connecting the second terminal of the first pump capacitor and the second terminal of the second pump capacitor to the first node in response to the first clock signal and the second clock signal, respectively, when the first switch circuit is turned off in the first time period; and
when the first switch circuit turns on, the first voltage is provided to the first and the second driving circuits through the first node.

* * * * *